US006031621A

United States Patent [19]

Binder

[11] Patent Number: 6,031,621

[45] Date of Patent: Feb. 29, 2000

[54] INFORMATION COLLECTION SYSTEM

[75] Inventor: Andrew J Binder, Boise, Id.

[73] Assignee: Hewlett-Packard Company, Palo Alto, Calif.

[21] Appl. No.: 08/743,947

[22] Filed: Nov. 5, 1996

[51] Int. Cl.[7] .............................. B41B 15/00; G06K 7/10; G06K 19/00; G06K 15/00

[52] U.S. Cl. ............................ 358/1.1; 358/1.1; 358/1.12; 358/1.13; 235/462.13; 235/487; 235/383; 235/385; 382/44; 382/54

[58] Field of Search ..................................... 395/101, 111, 395/113; 382/48, 54; 359/214; 235/383, 385, 462.13, 487; 358/1.1, 1.12, 1.14

[56] References Cited

U.S. PATENT DOCUMENTS

| | | | |
|---|---|---|---|
| 5,120,940 | 6/1992 | Willsie | 382/48 |
| 5,778,133 | 7/1998 | Piesko | 359/214 |
| 5,781,442 | 7/1998 | Engleson et al. | 364/478.02 |
| 5,801,844 | 9/1998 | Yamakawa et al. | 358/450 |
| 5,804,803 | 9/1998 | Cragin et al. | 235/375 |

*Primary Examiner*—Edward L. Coles
*Assistant Examiner*—Twyler Lamb
*Attorney, Agent, or Firm*—Gregg W. Wisdom

[57] ABSTRACT

An information collection system is used to improve the efficiency and accuracy of the collection of information for warranty database for printers. The system includes an information reading device attached to a computer system. Printer configuration and performance parameters which are to be collected are printed on a selftest page encoded as a bar code. In the preferred embodiment of the information collection system, the information reading device is a standard hand held bar code reader and the computer system is a portable computer. A windows based bar code reading utility is used to decode the data from the bar code reader. Information would be collected from the printer by printing a selftest page including the bar code, reading the bar code using the bar code reader, and storing the information decoded by the bar code reading utility on the hard disk drive of the computer system. At a later time, the data is transferred to the warranty database over a communications link such as a modem.

20 Claims, 3 Drawing Sheets

INFORMATION COLLECTION SYSTEM

TECHNICAL FIELD

This invention relates to the collection of information for products located in the field and more particularly to an information collection system for the collection of configuration and performance parameters for a printing system.

BACKGROUND OF THE INVENTION

As part of the process for servicing printers at customer sites in the field, printer specific data is collected and entered into a warranty database. This data includes information relating to the printer configuration and information relating to the printer performance. The warranty database serves as a source for a large volume of product quality and reliability information for printer products which have been shipped to customers. The information collected for the warranty database allows an ongoing analysis of the field quality and reliability of printer products to be performed. Through the use of the warranty database information, product problems are identified and the necessary corrective action is implemented in the field and/or at customer sites.

Typically, the data collected for the warranty database includes such basic information as the product model number, some sort of failure code used to classify the problem, a repair code to identify, at a relatively high level, the cause of the problem, and the actions undertaken to correct the problem. On occasion, problems arise in the field involving printer products for which it is required, generally because of the magnitude of the problem, that a very thorough investigation of the problem is performed to determine, at a very basic level, the cause of the problem. It is also sometimes the case that the root causes of the problems printers experience in the field are not easily determined and, for these cases, certain kinds of additional information in the warranty database would be very helpful to assist in determining the root causes of the problems.

The usual process for collection of this information involves customer service personnel manually recording the information for later manual entry into the warranty database. Given the time available for service personnel to perform service calls and the time required for recording collected information on customer service reports, collection of more than the basic information becomes impractical. In addition, manual collection of even the basic information is likely to introduce a substantial number of errors into the warranty database, thereby compromising its accuracy.

SUMMARY OF THE INVENTION

To improve the efficiency and accuracy of the collection of information, an information collection system is used to collect information from and related to a device, such as a printer, capable of printing the information. The information collection system includes an information reading device, such as a bar code reader or an optical scanner, operatively coupled to a computer system. The information may be printed as text for reading by an optical scanner or the information may be printed as a bar code for reading by a bar code reader or the optical scanner. The printed information may include some or all of the available device related information or information about the system in which the device operates.

The collection of information is accomplished by using the device to encode the information into a form for printing, such as text or a bar code, printing the information using the device, and then reading the printed information using the information reading device.

DESCRIPTION OF THE DRAWINGS

A more thorough understanding of the invention may be had from the consideration of the following detailed description taken in conjunction with the accompanying drawings in which.

DETAILED DESCRIPTION OF THE PREFERRED EMBODIMENTS

The present invention is not limited to the specific exemplary embodiments illustrated herein. Although the description of the preferred embodiment is particularly well suited to an application involving the collection of information from a laser printer or an inkjet printer, one of ordinary skill in the art will recognize that the disclosed information collection system may be useful for the collection of information from any printing system. Furthermore, the information collection system may be useful for the collection of information from and about any device having the capability of generating a printed output. For example, many types of specialized test and measurement equipment, such as chromatographs, spectra photometers, or particle analysis systems include the capability for generating a printed output. Using this capability for generating a printed output for printing bar codes or text would allow the collection information, such as configuration and performance information, from these devices.

Figure 1A:
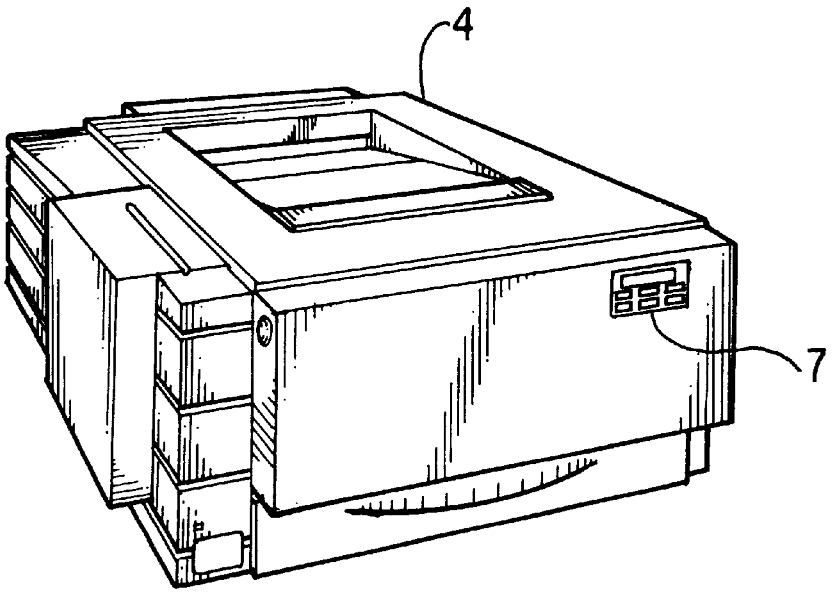
FIG. 1 is a diagram showing the principle elements of the preferred embodiment of the information collection system.
Figure 1B:
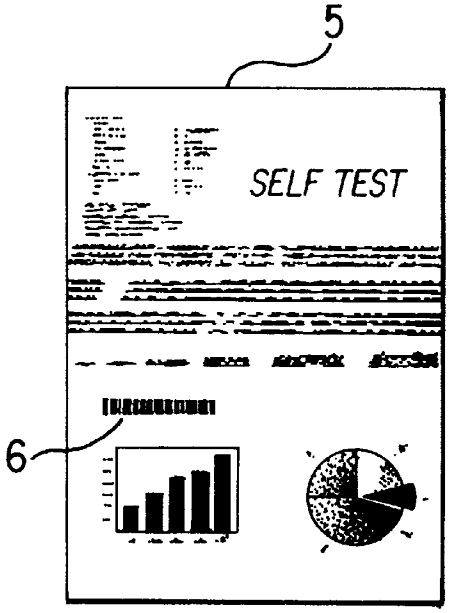
Figure 1C:
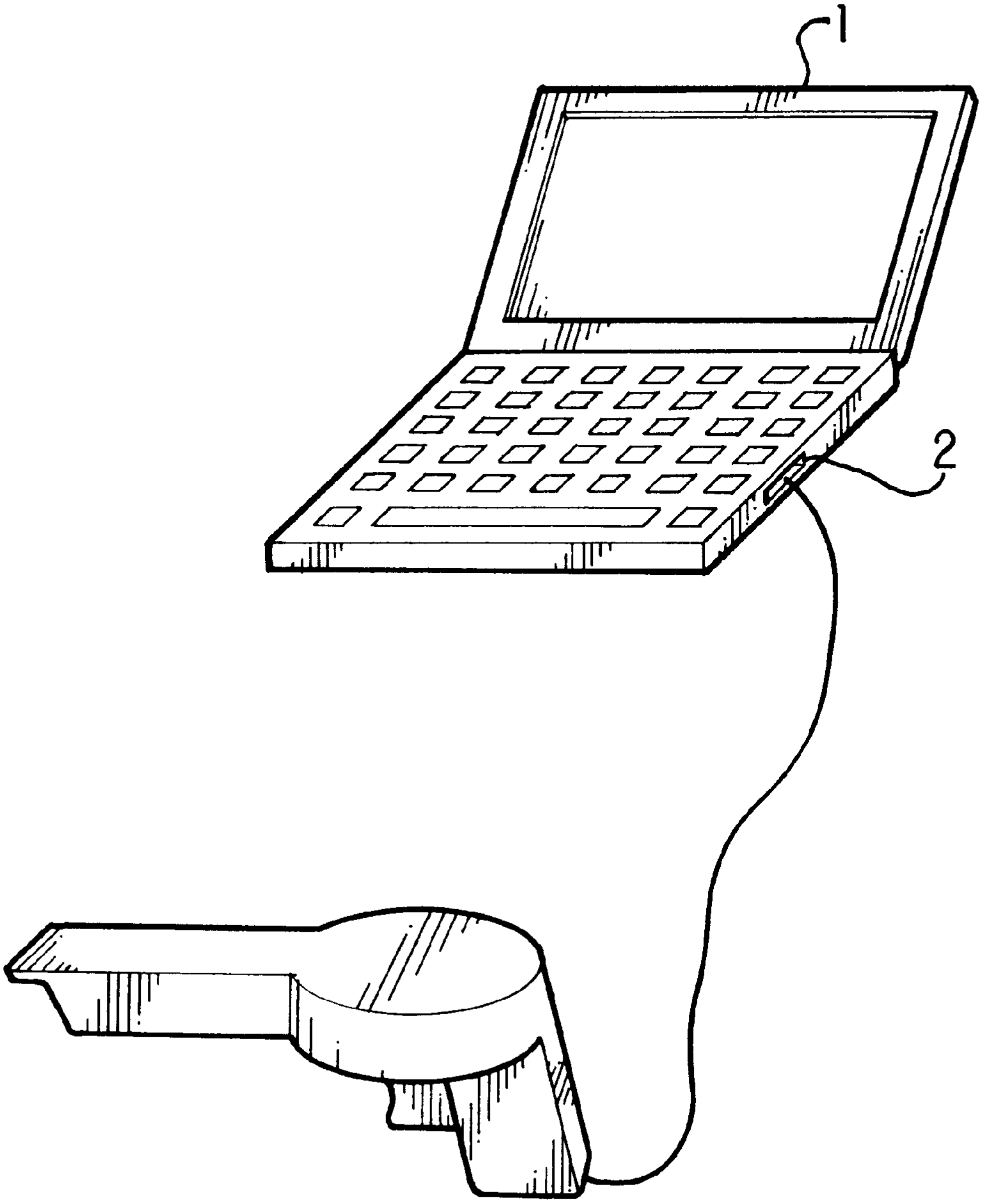

Shown in FIG. 1 is a simplified diagram which includes the preferred embodiment of the information collection system. Preferably computer system 1 is a portable computer running a "WINDOWS" based bar code reading utility which receives bar code data over the serial port 2 of computer system 1. As one of ordinary skill in the art will recognize from understanding this disclosure, the operating system with which the bar code reading utility operates is not limited to "WINDOWS". It is possible to use a bar code reading utility program compatible with other operating systems, such as "MSDOS" or "OS/2". In the preferred embodiment of the information collection system, the information reading device used is bar code reader 3. Bar code reader 3 can be the standard type of hand held bar code reader commonly used for reading universal product codes. Bar code reader 3 is connected to the serial port 2 of the computer system 1. Printer 4 is the product for which the information is to be collected.

As part of the internal test capability of printer 4, a self test page 5 is printed upon a user entered command from the front panel 7 of printer 4 or upon receiving the appropriate command from the host computer (not shown) which sends print data to printer 4. This self test page 5, generally includes in a printed text format, in addition to other information, printer and host computer system performance and configuration information. To allow for efficient and accurate recording of the desired information for entry into the warranty database, the desired information can be encoded into a bar code 6 on the self test page 5. By encoding this information into a bar code and printing bar code 6, potentially all of the performance and configuration information available from the printer 4 and the host computer system is made available for convenient collection and entry into the warranty database. Because the use of the information collection system allows easy collection and entry of such a substantial amount of detailed information into the warranty database, the usefulness of the resulting warranty database is greatly improved over a warranty database which relied upon manual collection and entry methods. It should be recognized that in the event that a single bar code is not sufficient to encode the desired information, multiple bar codes may be printed upon self test page 5.

The types of printer related performance and configuration information encoded into bar code 6 for collection may include the information listed below:

- the number of pages printed by the printer
- the serial numbers of the various printer electronic and mechanical assemblies
- the printer memory size
- the installed options
- the date of printer and/or printer option installation
- the number of power cycles the printer has undergone
- the printer firmware revision level
- the printer front panel settings
- temperature and humidity information
- dates of previous service calls
- printer event logs
- consumable usage history It may also be useful, for failure analysis purposes, to include information in the warranty database from the host computer system with which the printer operates. The host computer system information could be downloaded, upon command from the host computer system or the printer 4, into the printer 4 for encoding into a bar code. This host computer system information may include:

- the revision level of the printer driver software used by the host computer system
- the configuration of the host computer system
- the time and date of the service call.

Depending upon the types of problems which can occur, it may be useful to include other types of printer or host computer system related information in the warranty database. For example, as disclosed in co-pending patent application entitled "IMAGE FORMING AND OFFICE AUTOMATION DEVICE CONSUMABLE WITH MEMORY", having patent application docket number 10951100-1, assigned to the assignee of this patent application and incorporated by reference herein, the information downloaded from the host computer may include information related to and stored in memory associated with a consumable, such as the electrophotographic print cartridge included in printer 4.

As is standard for bar codes, the information is encoded by varying the widths of the bars forming the bar code 6. Bar code reader 3 is then used to read the encoded information and transmit this information to computer system 1 through the serial port 2. Included in the bar code reading utility is the capability for storing digital data to a memory storage device such as a hard disk drive, a floppy disk drive, flash memory or other non-volatile type memory storage device included in computer system 1. If the information were stored on a floppy disk, the floppy disk could be read by the computer system containing the warranty data base to merge the collected information with the warranty database information. If the information were stored on a hard disk drive or in a flash memory, the information could be downloaded to the computer system containing the warranty database through a modem or other type of communications link.

It will be recognized by one of ordinary skill in the art from understanding this specification that the disclosed information collection system may have uses other than the collection of information for a warranty database. For example, customers having problems with their printers could print out a bar code containing diagnostic information and mail or fax this into a customer service center. This diagnostic information includes a current update of the continually changing printer configuration and performance information. Customer support personal could read the bar code into their computer system which would then generate a list of suggested steps to perform to correct the problems based upon the diagnostic information contained in the bar code.

Although the preferred embodiment of the information collection system employs a portable computer for receiving the bar code data, one of ordinary skill in the art will recognize after understanding this specification that any computer system which includes the capability to interface with an information reading device and which could either store digital data into a memory storage device or transmit digital data over a communications link could be used for computer system 1. In addition, although the preferred embodiment of the information collection system uses bar code reader 3 as the information reading device, one of ordinary skill in the art will recognize after understanding this specification that it would also be possible to use an optical scanner as the information reading device. Use of an optical scanner would also require the use of image processing software to decode the information encoded in the scanned bar code image. Furthermore, by using optical character recognition software with the optical scanner, the information to be collected could be printed out in a text form and read by using the optical scanner. This implementation of the information collection system would allow collection of information without requiring the printing of a bar code.

Figure 2:
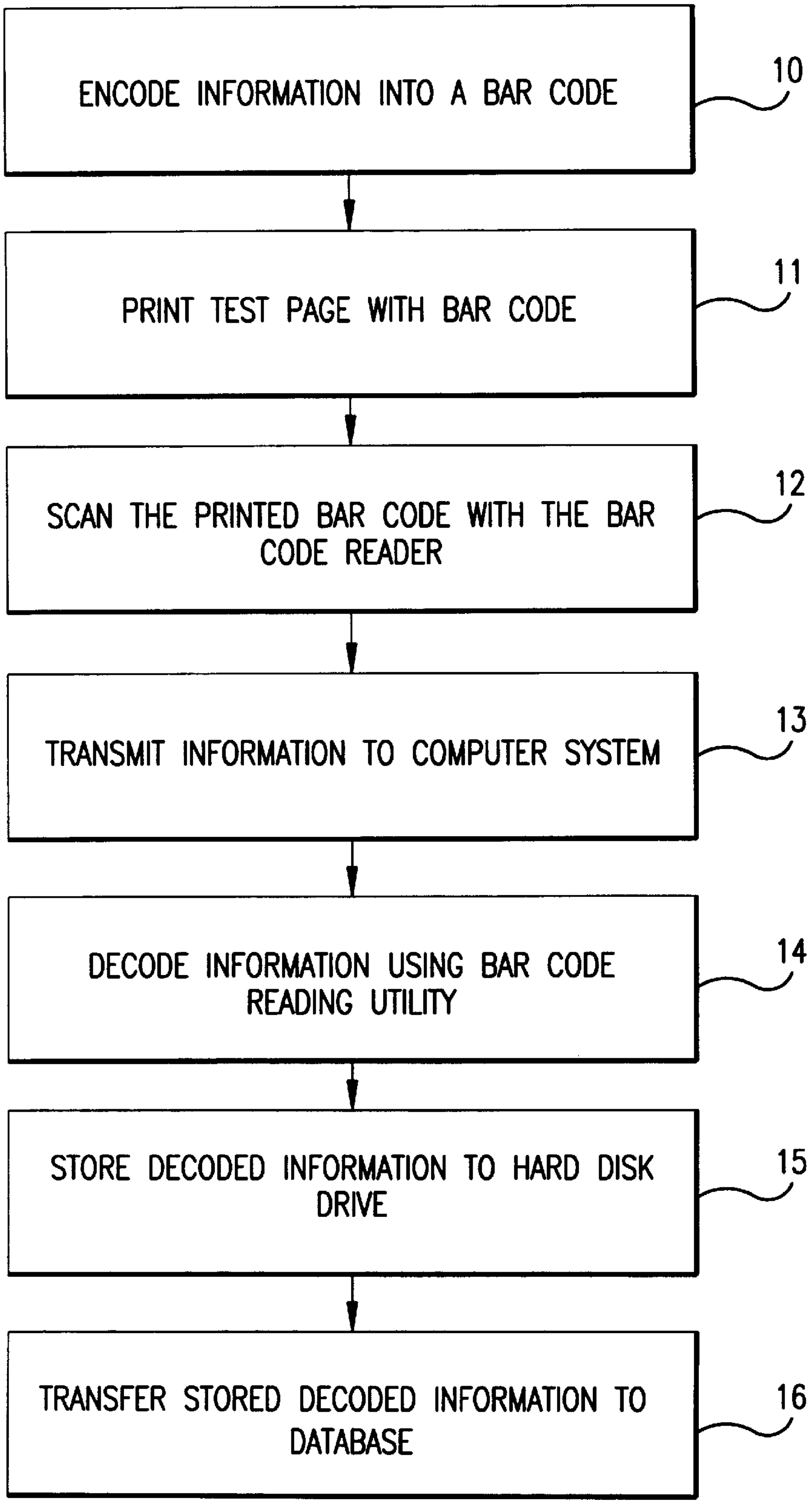
FIG. 2 is a flowchart of the process of collecting information using the preferred embodiment of the information collection system.

Shown in FIG. 2 is a flow chart for the process of collecting information using the preferred embodiment of the information collection system.

First, the printer encodes 10 the information to be collected in a bar code. Then, a test page containing a bar code is printed 11 using printer 4. Next, bar code reader 3 is used to scan 12 the printed bar code 6. Bar code reader 3 transmits 13 the information from the bar code 6, decoded as a sequence of numbers, to computer system 1. Then, the sequence of numbers is converted 14, by the "WINDOWS" based bar code reading utility, into the format for entry into the warranty database. The converted data is then stored 15 on the hard disk drive of computer system 1 for eventual transfer 16 to the computer system containing the warranty database.

Although an embodiment of the invention has been illustrated, and that form described, it is readily apparent to those skilled in the art that various modifications may be made therein without departing from the spirit of the invention or from the scope of the appended claims.

What is claimed is:

1. In an information collection system including an information reading device operatively coupled to a computer system, a method for collecting information from and related to a device capable of printing said information for a warranty database, said method comprising the steps of:

encoding said information using said device;

printing said information using said device;

reading said information using said information reading device; and storing said information in said warranty database.

2. The method as recited in claim 1 in which said information reading device includes the capability for reading a bar code and said device includes the capability for printing said bar code, wherein:

said step of encoding includes encoding said information into a bar code using said device;

said step of printing includes printing said bar code using said device; and said step of reading includes reading said information from said bar code using said information reading device.

3. The method as recited in claim 2 in which said computer system executes a bar code reading utility program, wherein:

said step of storing includes decoding said information using said bar code reading utility program to generate decoded information.

4. The method as recited in claim 3 in which said computer includes a memory storage device, wherein:

said step of storing includes storing said decoded information in said memory storage device.

5. The method as recited in claim 4, wherein:

said step of storing includes transferring said decoded information stored in said memory storage device to said warranty database.

6. The method as recited in claim 5, wherein:

said information reading device includes an optical scanner.

7. The method as recited in claim 5, wherein:

said information reading device includes a bar code reader.

8. The method as recited in claim 7, wherein:

said memory storage device includes a hard disk drive.

9. The method as recited in claim 8, wherein:

said memory storage device includes a floppy disk drive.

10. A system for collecting information in a printed form for a warranty database, with said information in said printed form generated by a device and related to said device, said system comprising:

a computer system for executing an information reading utility program;

an information reading device operatively coupled to said computer for reading said information in said printed form, with said computer system configured to receive said information from said information reading device and configured to store said information in said warranty database.

11. The system as recited in claim 10, wherein:

said information reading utility program includes a bar code reading utility program;

said information reading device includes the capability for reading a bar code; and said printed form of said information includes a bar code.

12. The system as recited in claim 11, wherein:

said information reading device includes an optical scanner.

13. The system as recited in claim 11, wherein:

said information reading device includes a bar code reader.

14. The system as recited in claim 13 wherein:

said device includes an inkjet printer.

15. The system as recited in claim 13, wherein:

said device includes a laser printer.

16. The system as recited in claim 15, wherein:

said computer system includes a portable computer.

17. The system as recited in claim 16, wherein:

said computer system includes a memory storage device for storing said information.

18. The system as recited in claim 17, wherein:

said memory storage device includes a hard disk drive.

19. The system as recited in claim 18, wherein:

said memory storage device includes a floppy disk drive.

20. The system as recited in claim 19, wherein:

printing of said bar code occurs on a selftest page generated by said laser printer.

* * * * *